March 5, 1963 O. K. KOWALLIS 3,079,795
ELECTRICAL MEASURING SYSTEM
Filed Dec. 11, 1958 2 Sheets-Sheet 1
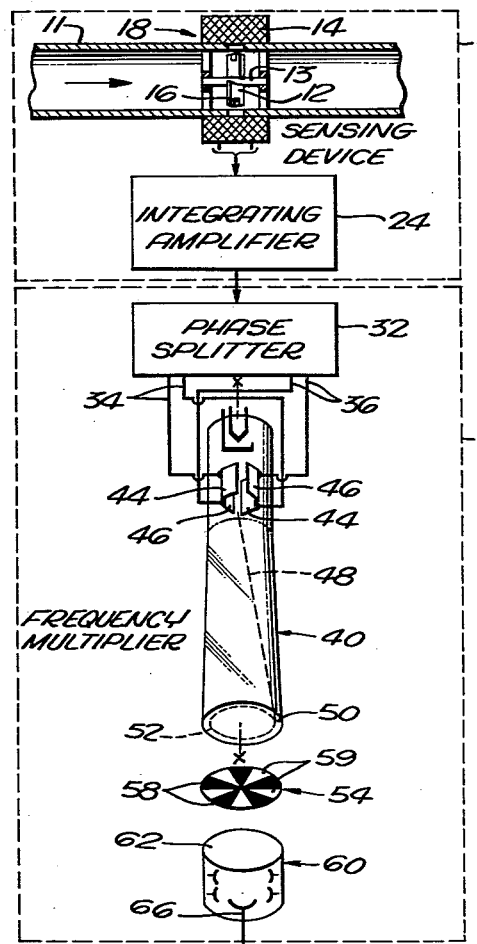
FIG. 1.
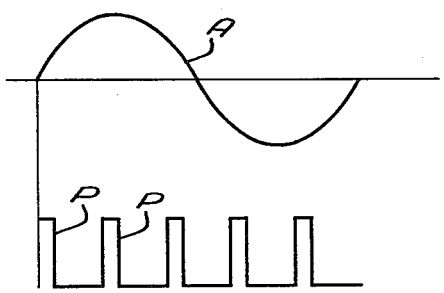
FIG. 2.
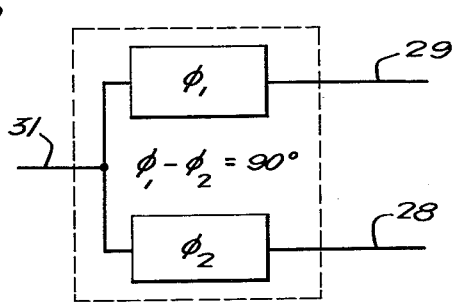
FIG. 3.
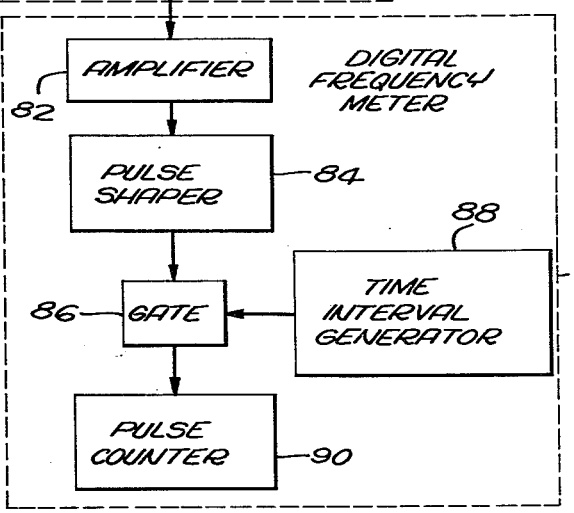
INVENTOR.
OTTO K. KOWALLIS
BY
ATTORNEY

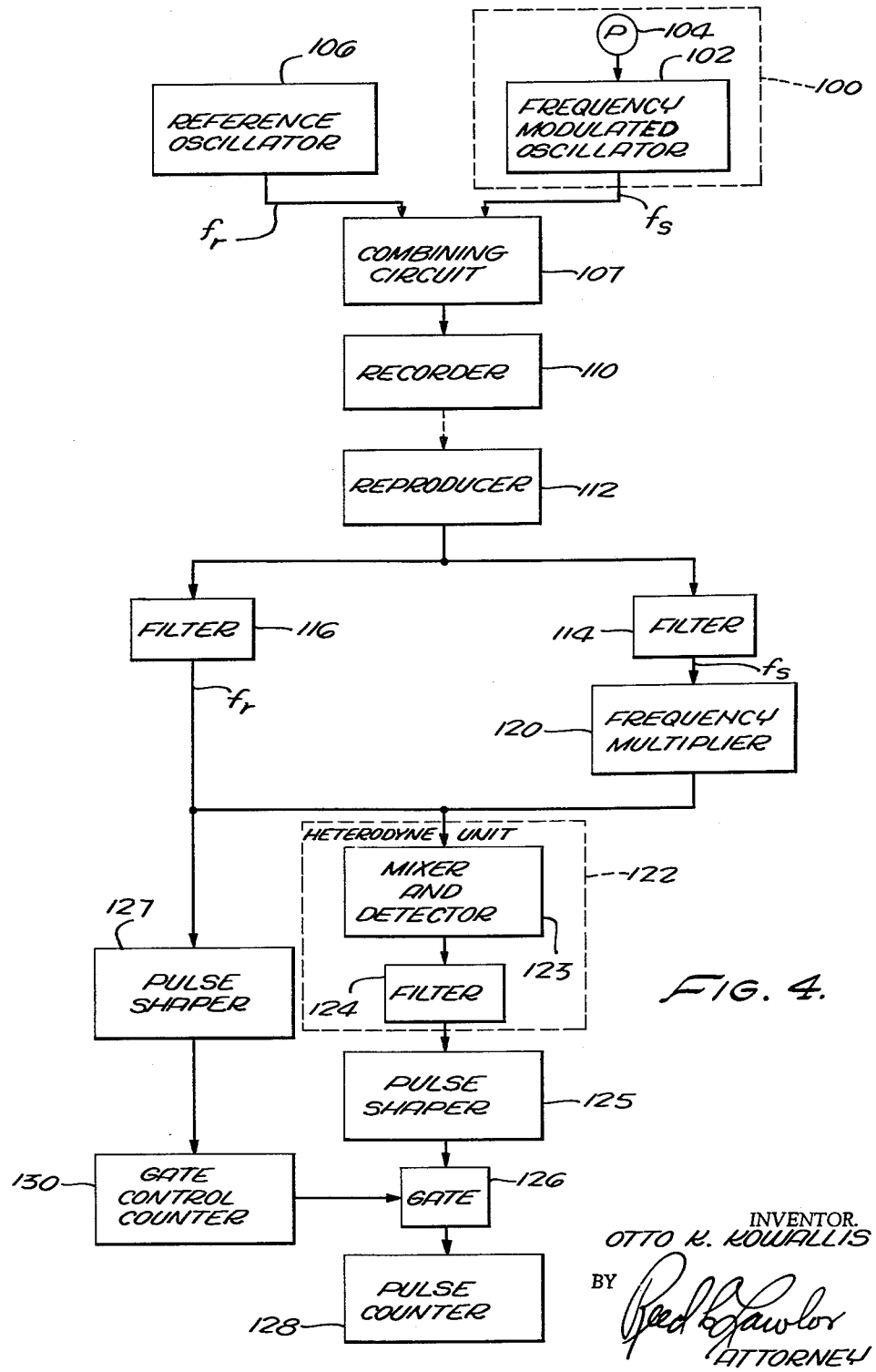

3,079,795
ELECTRICAL MEASURING SYSTEM
Otto K. Kowallis, Pasadena, Calif., assignor, by mesne assignments, to Tamar Electronics, Inc., Gardena, Calif., a corporation of California
Filed Dec. 11, 1958, Ser. No. 779,697
12 Claims. (Cl. 73—194)

This invention relates to electrical measuring systems and more particularly to an improved system for accurately measuring the amplitude of a physical condition by digital techniques.

Many systems have been developed for producing a series of pulses at a frequency which is proportional to the magnitude of a variable condition and then for counting the number of pulses produced in a selected interval of time in order to indicate the magnitude of the varaible condition. All these systems are limited in their accuracy or resolving power by the maximum rate at which pulses are generated. This maximum pulse rate occurs when the magnitude of the physical condition is at its maximum value.

To illustrate, suppose that a device is provided which produces no pulses when the magnitude of a physical condition has its zero value and that pulses are generated at the rate of 1000 p.p.s. (pulses per second) when the magnitude of the physical condition has 100% of the maximum value over which the measurements are to be made. The reading corresponding to such a 100% value is called the full-scale reading. Suppose further that the system is arranged to count the number of pulses generated in an 0.2-second interval. Then if counts of pulses are made over that interval of time, the magnitude of the physical condition can be accurately indicated, if the magnitude is 51% or 51.5% of the full scale reading. However, the correct magnitude cannot be accurately indicated if it is 50.8% of the full scale reading. Generally speaking, the accuracy or resolving power of the system, that is the size of the steps between successive magnitudes which can be accurately indicated, is proportional to the pulse rate and to the interval of time over which the measurements are made.

In many applications, it is very desirable to make the measurement of the magnitude of the physical condition at frequent intervals. Under these circumstances, it is necessary to make the measurements over very short intervals of time, such, for example, as one-tenth of a second or a millisecond.

Attempts have been made in the past to increase the resolving power of such a system by employing a frequency multiplier between the measuring device and the counting device. Such frequency multipliers have been in the form of a number of cascaded full-wave rectifiers that act as frequency doublers. Difficulty has been encountered in employing such frequency multipliers because of the fact that when the multiplication factor is very large, such as eight or sixteen or more, the signal-to-noise ratio is decreased, thereby rendering the measuring system unreliable, if not completely inoperative.

According to this invention, the resolving power of such a measuring system is increased by utilizing a frequency multiplier of a specific type. A frequency multiplier of the type employed in this invention utilizes a target which has a pluraltiy of beam-sensitive sectors equal in number to the multiplication factor desired and means for scanning the sectored target with an electron beam at a frequency proportional to the primary frequency of the signal generated by the sensing device, together with means controlled by the impingement of the electron beam on the sectors of the target to generate a train of pulses which occur at a secondary frequency which is an integral multiple of the primary frequency. By counting the pulses in the secondary-frequency signal over a predetermined interval of time, measurements of greater resolving power are attainable. In one form of the invention the frequency multiplier is in the form of a cathode-ray tube which is scanned circularly by the electron beam, together with a sectored mask at the face of the tube and a photodetector for receiving light generated by impingement of the electron beam on the parts of the cathode-ray-tube screen which can be "seen" by the photodetector. In this case the sectors of the screen that are seen by the photo-detector constitute the beam-sensitive sectors.

By the use of this invention, it is possible to attain a higher multiplication factor and a higher degree of reliability and accuracy than heretofore. Furthermore, with this invention, by providing interchangeable masks, it is a very simple matter to change the multiplication factor so as to make it possible to alter the resolving power or the full-scale reading of the system.

The foregoing and other advantages of the invention, will be understood by reference to the following description taken in connection with the accompanying drawing wherein:

FIG. 1 is a schematic diagram of an embodiment of the invention;

FIG. 2 is a graph employed in explaining the invention;

FIG. 3 is a block diagram of a phase splitter employed in the embodiment of FIG. 1; and FIG. 4 is a block diagram of another form of the invention.

The embodiment of the invention illustrated in FIG. 1 constitutes a system for measuring the rate of flow of liquid in a pipe. This system includes a sensing device 10, a frequency multiplier 30, and a digital frequency meter 80. In the sensing device 10 a propeller 12 on an axial shaft 13 is mounted transversely of the axis of the pipe 11 in the plane of a stator 14. A rotor 16 on the periphery of the propeller and the stator 14 act as an electrical generator 18. Devices of this type that are used as flow-meters are well known in the art. Typical flow meters of that type are manufactured and sold by Potter Pacific of Woodland, California, under model numbers 3C, 57, and 58, and by Waugh Engineering of Van Nuys, California, under type numbers AR102-1 and 102-4. With such a generator 18 both the frequency and the amplitude of the electrical signal generated at the output are proportional to the speed of rotation of the propeller 12. For convenience this frequency will sometimes be referred to herein as the primary frequency. With this device, the frequency of the electrical signal so produced is proportional to the speed of flow of liquid in the pipe 10 at least over a wide range of flow speed. The output of the generator 18 is passed through an integrating amplifier 24 so as to provide at its output a signal of substantially constant amplitude but of the same frequency.

The output of the integrating amplifier 24 is applied to a phase splitter 32 which has two outputs 34 and 36 at which appear two quadrature signals of equal amplitude. The two quadrature signals have the same frequency as the primary frequency, that is two signals that are spaced apart electrically by 90° at that frequency. The two quadrature signals appearing at the outputs 34 and 36 are applied to vertical and horizontal pairs of deflection plates 44 and 46 respectively of a cathode ray tube 40. In effect, the two output signals applied to the deflecting plates create in the area between the plates an electrical field which is of substantially constant magnitude but which rotates about the axis X—X of the cathode ray tube at the primary frequency.

Because of the action of the rotating deflecting field so produced, an electron beam 48 that is projected to the fluorescent screen 50 at the end of the tube scans the screen along a circular path 52 that is concentric with the axis X—X. The screen itself is of the fast-phosphor type, that is, the phosphor in the screen is of a type which remains luminescent for only a very short interval of time after the beam of electrons has been removed. A suitable screen is one which is designated by the trade symbol P15.

A replaceable sectored disc 54 is mounted externally of the cathode ray tube adjacent the fluorescent screen 50. The sectored disc 54 is in the form of a transparent film having black opaque sectors and transparent sectors 58 and 59 respectively alternately arranged thereon. The black sectors are formed by photographing a suitable sectored diagram on a clear sheet of photographic film, the black sectors 58 being in the form of opaque deposits in the developed emulsion of the film.

A photodetector 60 such as a photomultiplier tube having an end-on photo-cathode 62 is arranged on the axis X—X of the cathode ray tube. In effect, the photodetector 60 "sees" the screen 50 through the windows or clear sectors 59 of the sectored disc 44. While the electron beam 48 traverses a portion of the screen 50 adjacent one of the windows, light is transmitted through the disc 54 to the photo-cathode 62, thereby producing an electric current at the output 66 of the photodetector 60. But, whenever the electron beam 48 is impinging on a portion of the screen 52 opposite one of the opaque sectors 58, no light is transmitted from the screen to the photo-cathode 62. For this reason, in each cycle of the electron beam 48 about the circular path 52, a number N of electrical pulses are produced at the output 66 of the photo-cathode 62 equal in number to the number of clear sectors. For this reason the frequency of the signal generated at the output of the photodetector is N times the primary frequency of the signal produced by the generator 18. The frequency of the signal so generated is sometimes referred to herein as the secondary frequency. In a case in which the mask has five opaque sectors and five clear sectors, frequency multiplication by a factor of 5 is obtained. In this case, as illustrated in FIG. 2, during each cycle A of the alternating current produced by the generator 18, five square wave pulses P appear at the output of the photo-detector 60. Even though the instantaneous amplitude of the signal generated by the electrical generator 18 varies sinusoidally as a function of time, the amplitudes of the pulses P are all the same. Furthermore, it will be noted that since the sectors 58 and 59 are uniformly spaced about the axis X—X, the pulses P occur at regular intervals. The phase splitter 32, the cathode ray tube 40, the sectored disc 54, and the photo-detector 60 thus provide a frequency multiplier 30. By the use of the phase splitter, a sinusoidal signal supplied to the input of the frequency multiplier is converted into a series of square-wave pulses of uniform amplitude.

So long as the rate of flow of the liquid in the pipe 11 is constant, the primary frequency of the signal produced by the generator 18 is constant. The angular speed of the electron beam about the axis X—X is also constant. For this reason, the secondary frequency at which the pulses P occur is also constant, the secondary frequency being N times the primary frequency. If for any reason the rate of flow of the liquid in the line 11 is changing or is fluctuating, the primary frequency of the signal provided by the generator 18 and the angular speed of the electron beam vary in a corresponding manner.

With this arrangement the angular speed of the electron beam 48 about the axis X—X is proportional at any instant to the velocity of flow of liquid in the pipe 11. Consequently with this arrangement the rate of production of pulses at the output of the photodetector, that is the secondary frequency, is proportional at any instant to the rate of flow of the liquid.

In order to measure the rate of flow, the train of pulses P developed by the photodetector 60 are first amplified and shaped by an amplifier 82 and a pulse shaper 84. The shaped and amplified pulses are then transmitted to a pulse-counter 90 through a gate 86 which is opened for a predetermined interval of time by a time-interval generator 88. The pulse-counter 90, the gate 86 and the time-interval generator 88 constitute an integrating events-per-unit-time meter such as the E-put meter manufactured by the Berkeley Division of Beckman Instruments. In this application the E-put meter is used as a digital frequency meter.

The screen 50 and the sector disc 54 in effect constitute a sectored target, having beam-sensitive sectors corresponding to the windows 59 and insensitive sectors corresponding to the opaque sectors 58 and the photodetector 60 constitutes means for detecting the impingement of the electron beam on the sensitive sectors of the target.

In the phase-splitter illustrated in FIG. 3, two phase-shift networks are employed. One introduces a phase-shift of $\phi_1$ and the other introduces a phase-shift of $\phi_2 = \phi_1 - 90°$, thus producing a 90° phase shift between the signals appearing at the two outputs 28 and 29 over a wide band of frequencies and hence over a wide range of flow rates. Circuits having such characteristics are well known in the art. See for example the article entitled "Properties of Some Wide-Band Phase-Splitting Networks," Proc. I.R.E., vol. 37, February 1949, pp. 147–151, and the article entitled "Design of Wide-Band Phase-Splitting Networks," Proc. I.R.E., vol. 38, July 1950, pp. 754–770.

The maximum multiplication factor that may be employed depends on a number of conditions, including, among others, the relative size of the electron beam and the length of path traversed by the beam, the harmonic content of the wave applied to the oscilloscope, the degree of offset between the center of the mask and the center of the path traversed by the electron beam, and the accuracy of the phase relationship between the signals appearing in the output of the phase-splitter. Even though the accuracy is limited by such factors, it has been found very easy to attain frequency multiplication by a factor of the order of 40 to 100. Such a high multiplication factor can be achieved with a high signal-to-noise ratio and the multiplication factor may be readily changed by replacement of masks.

Though the frequency multiplier described is of a specific type which employs a mask between the screen of a cathode-ray oscilloscope and a photodetector, it will be understood that other types of frequency multipliers may be employed. Thus, for example, the frequency multiplier may be of the type illustrated in the Hund Patent No. 1,929,067 or in the Hansell Patent No. 2,005,782 or the Evans Patent No. 2,086,904.

In the embodiment of the invention illustrated in FIG. 4, the sensing device 100 employs a frequency modulated oscillator 102 that is actuated by a pressure sensing unit 104. The pressure sensing unit 104 is of a type that generates a direct current having a magnitude that is proportional to the change of pressure to which the element 104 is subjected. This direct current is employed to modulate the frequency modulated oscillator 102. Such a sensing device 100 is described and claimed in co-pending application Serial No. 705,891, filed December 30, 1957 by Thomas H. Wiancko. In such a sensing device, the frequency of the oscillator 102 is normally at some standard value, say $f_s$ when a standard pressure is applied to the pressure detector 104 and the frequency deviates from the standard frequency $f_s$ by an amount $\Delta f$ that is proportional to the change in the pressure.

In the system illustrated in FIG. 4, use is also made of a reference oscillator 106 which supplies a signal at a constant reference frequency $f_r$. The two frequencies $f_r$ and $f_s$ in this system are widely separated and differ from each other by the multiplication factor N which is employed in the frequency multiplier as later described. Assuming for example that the multiplication factor is 10, then $$f_r = 10 f_s$$

In this system the outputs of the two oscillators 102 and 106 are combined in a combining circuit 107 and applied to a common track of a phonographically reproducible magnetic tape record in a magnetic tape recorder 110. In some such systems the combining circuit 107 may actually include a radio transmission link such as is used in a telemetering system. In such a unit, the mixed signal is recorded on a single track of the record tape.

Subsequently, when it is desired to determine information regarding the variations in pressure, the signals on the recording tape are reproduced by a reproducer 112 and the output of the reproducer is applied to filters 114 and 116 which segregate the two signals on the tape that represent recordings of the outputs of the respective oscillators 102 and 106. The filter 114 is in the form of a band-pass or low-pass filter which selectively transmits signals of the frequency generated by the frequency modulated oscillator 102 and which selectively attenuates signals of the frequency of the reference oscillator 106. Similarly, the filter 116 is either a band-pass filter or a high-pass filter which transmits therethrough signals at the frequency $f_r$ of the reference oscillator 106 and which attenuates frequencies of signals generated by the frequency modulated oscillator 102. In this description it is assumed that the reproducer and the recorder operate at substantially the same speed. If on the other hand the reproducer operates at a different speed from that of the recorder, account is taken of this fact in the design of the filters 114 and 116.

The output of the filter 114, which corresponds to the output of the frequency modulated oscillator 102 is transmitted through a frequency multiplier 120 of the type hereinbefore described. As mentioned above, the multiplication factor of the frequency multiplier 120 is equal to the ratio of the frequency $f_r$ of the reference oscillator and the standard frequency $f_s$ of the frequency modulated oscillator 102. The two signals appearing at the output of the reference-oscillator filter 116 and the output of the frequency multiplier 120 are applied to a heterodyne unit 122. In the heterodyne unit, the two signals are mixed and rectified in a mixer-detector unit 123. The output of the mixer-detector unit 123 is applied to a band-pass filter 124 which transmits signals having frequencies that are equal to the difference in frequencies of the two signals applied to the input of the heterodyne unit. In other words, the filter 124 attenuates frequencies equal to $f_r$ and $f_s + \Delta f$ but is designed to transmit a heterodyne signal that has a frequency that is equal to the deviation frequency $\Delta f$.

The pulses in the output of the heterodyne unit are peaked by a pulse shaper 125. The shaped pulses are then transmitted through a gate 126 to a pulse counter 128. The gate 126 is opened for a selected interval determined by a gate control counter 130 which is actuated by signals that have been transmitted through the reference-oscillator filter 116 and then through a pulse shaper 127. The gate control counter 130 in effect opens the gate 126 for an interval of time corresponding to a predetermined number of cycles of the reference oscillator. Since the ratio of the frequencies being reproduced at any one time in the reproducer 112 is independent of fluctuations in the speed of the tape in the reproducer, the number of pulses or cycles that are transmitted through the gate 126 is independent of any such fluctuations. Accuracy is also aided by recording the signals on only a single track of the tape. The pulses appearing at the output of the gate 126 are counted by means of a pulse counter 128 as previously described.

Since the gate is opened for a predetermined time interval, the counter not only counts the pulses in the heterodyne signal but actually provides a count of the number of pulses in the secondary-frequency signals. In other words, the count C indicated by the counter when added to the number of pulses B occurring in the predetermined interval equals the number of pulses A of the secondary-frequency signal during that time interval.

From the foregoing description it is thus seen that this invention provides an arrangement for increasing the resolution of a digital system employed for measuring variations in the amplitude of a physical condition. While the invention has been described with reference to specific applications for measuring flow rate and pressure, it is to be understood that the invention may be applied to the measurement of other physical conditions.

It is therefore to be understood that the invention is not limited to the specific forms thereof that have been described and that it may be applied in many other ways than those specifically described herein, all within the scope of the appended claims.

The invention claimed is:

1. In a device that responds to a physical condition of variable magnitude to produce an alternating electrical signal that has a primary frequency that varies as a function of the magnitude; the combination comprising:

a cathode ray oscilloscope having a fluorescent screen;

means for directing an electron beam toward said screen to cause said screen to emit light from a point thereof while said beam is impinging thereon, and having beam-deflection means;

means connected to said deflection means and controlled by said alternating current for causing an electron beam to cyclically scan said target along a peripheral path at a speed proportional to said primary frequency;

a photodetector for receiving light emitted from said screen;

a multiple-sectored mask external to said oscilloscope between said screen and said photodetector for causing pulses of light to impinge on said screen at a secondary frequency that is a multiple of said primary frequency; and means for measuring the number of such electrical pulses that are developed during a predetermined time interval.

2. The combination with an alternating-current generator:

means responsive to a variable physical condition for driving said generator at a speed proportional to the magnitude of said variable physical condition whereby the primary frequency and the amplitude of the alternating current developed by said generator are each proportional to said magnitude;

of an integrating amplifier driven by said alternating current generator for producing an electrical signal of substantially constant amplitude, but having a primary frequency proportional to the magnitude of said physical condition;

a target having a plurality of sectors that are spaced along a selected path;

means controlled by said electrical signal for causing a light beam to scan said target along said path at said primary frequency;

means controlled by successive impingement of said light beam on the sectors of said target for developing a series of electrical pulses for each cycle of said alternating current; and means for meausring the number of such electrical pulses that are developed during a predetermined time interval.

3. In combination:

first and second oscillators;

a frequency multiplier for multiplying the frequency $f$ of the signal generated by said first oscillator by an integral factor N to generate a signal having a secondary frequency $Nf$ equal to the frequency $f_r$ of said second oscillator when a physical condition to be measured has a standard value;

means responsive to a change in said physical condition for causing the frequency of the signal generated by said first oscillator to vary as a function of the change of said physical condition, whereby the difference between said frequencies $Nf$ and $f_r$ varies in proportion to said change;

a gate opened by said second oscillator for a time interval corresponding to the duration of a predetermined number of oscillations of said second oscillator; and means controlled by said gate for determining the difference in the number of oscillations produced by said oscillators in said time interval.

4. In combination:

a frequency-modulated oscillator having a standard frequency $f_s$;

a reference oscillator characterized by a reference frequency $f_r$ that is an integral multiple $N$ of the standard frequency;

means responsive to a change in a physical condition for causing the primary frequency of the signal generated by said frequency-modulated oscillator to deviate from said standard frequency by an amount $\Delta f$ that is proportional to a change of said physical condition;

a frequency multiplier for multiplying the frequency $f_s + \Delta f$ of the signal generated by said frequency-modulated oscillator by an integral factor $N$ to generate a signal having a secondary frequency $$N(f_s + \Delta f);$$

a gate opened by said reference oscillator for a time interval corresponding to the duration of a predetermined number of oscillations of said latter reference oscillator; and means including a counter controlled by said gate for counting the difference in the number of oscillations produced by said two oscillators in said time interval.

5. In combination:

a frequency-modulated oscillator having a standard frequency $f_s$;

a reference oscillator characterized by a reference frequency $f_r$ that is an integral multiple $N$ of the standard frequency;

means responsive to a change in a physical condition for causing the frequency of the signal generated by said frequency-modulated oscillator to deviate from said standard frequency by an amount $\Delta f$ that is proportional to a change of said physical condition;

a frequency multiplier for multiplying the frequency $f_s + \Delta f$ of the signal generated by said frequency-modulated oscillator by an integral factor $N$ to generate a signal having a secondary frequency $N(f_s + \Delta f)$;

a heterodyne unit for converting the signals supplied by said frequency multiplier and said reference oscillator into a heterodyne signal having the frequency $\Delta f$;

a gate opened by said reference oscillator for a time interval corresponding to the duration of a predetermined number of oscillations of said reference oscillator; and means including a counter controlled by said gate for counting the number of oscillations and said heterodyne signal in said time interval.

6. In combination:

a frequency-modulated oscillator having a standard frequency $f_s$;

a reference oscillator characterized by a reference frequency $f_r$ that is an integral multiple $N$ of the standard frequency;

means responsive to a change in a physical condition for causing the frequency of the signal generated by said frequency-modulated oscillator to deviate from said standard frequency by an amount $\Delta f$ that is proportional to a change of said physical condition;

means for recording said two signals on a common track of a phonographically reproducible record;

means for separately reproducing the two recorded signals;

a frequency multiplier for multiplying the frequency $f_s + \Delta f$ of the reproduced signal corresponding to the signal generated by said frequency-modulated oscillator by an integral factor $N$ to generate a signal having a secondary frequency $N(f_s + \Delta f)$;

a heterodyne unit for converting the other reproduced signal and the output of said frequency multiplier into a heterodyne signal having the frequency $\Delta f$;

a gate opened by said reference oscillator for a time interval corresponding to the duration of a predetermined number of oscillations of said other reproduced signal; and means including a counter controlled by said gate for counting the difference in the number of oscillations of said heterodyne signal in said time interval.

7. In combination:

first and second oscillators;

a target having a plurality of sectors that are spaced along a selected path;

means controlled by the alternating current supplied by said first oscillator for causing an electron beam to scan said target along said path at a primary frequency;

means controlled by successive impingement of said electron beam on the sectors of said target for developing a series of electrical pulses for each cycle of said alternating current whereby a signal of secondary frequency that is a multiple $N$ of said primary frequency is generated, the secondary frequency of the signal so produced being equal to a standard frequency when a physical condition to be measured has a standard value;

means responsive to a change in said physical condition for causing the primary frequency of the signal generated by said first oscillator to vary from said standard frequency as a function of the change of said physical condition;

a counter; and a means including a gate controlled by said secondary frequency signal and the frequency of the signal generated by said second oscillator for supplying to said counter a number of pulses that are proportional to said changes in physical condition.

8. In combination:

two oscillators;

a target having a plurality of sectors that are spaced along a selected path;

means controlled by the alternating current supplied by one of said oscillators for causing an electron beam to repeatedly scan said target along said path at a primary frequency;

means controlled by successive impingement of said electron beam on the sectors of said target for developing a series of electrical pulses for each cycle of said alternating current whereby a signal of secondary frequency that is a multiple $N$ of said primary frequency is generated, the secondary frequency of the signal so produced being equal to the reference frequency of the signal produced by the other oscillator when a physical condition to be measured has a standard value;

means responsive to a change in said physical condition for causing the primary frequency of the signal generated by said one oscillator to vary as a function of the change of said physical condition whereby the secondary frequency deviates from said reference frequency by a frequency difference that is proportional to said change in physical condition, said signals of secondary frequency and reference frequency forming counter-operating signals;

a gate opened by one of said counter-operating signals for a time interval corresponding to the duration of a predetermined number of cycles of said counter-operating signal; and means including a counter controlled by said gate for counting the number of cycles corresponding to said frequency difference occurring in said time interval.

9. In combination:

a frequency modulated oscillator that generates an alternating current of variable frequency;

a device that responds to a physical condition of variable magnitude for varying the frequency of said alternating current by an amount that is a function of the magnitude;

a fluorescent target having a relatively short delay time;

means for directing an electron beam towards said target to cause said target to emit light from the point thereon at which said beam impinges;

a mask having a plurality of equally spaced sectors that are disposed along a selected path positioned to receive said emitted light;

means controlled by said alternating current for causing said beam and hence said emitted light to cyclically scan said mask along said selected path at a primary frequency proportional to said variable magnitude;

pulse developing means controlled by successive impingement of said light on the sectors of said mask for developing a series of electrical pulses for each scanning cycle;

and means for measuring the number of such electrical pulses that are developed during a predetermined time interval, whereby to multiply said primary frequency by one-half the number of said spaced sectors.

10. The combination set forth in claim 9, wherein said pulse developing means includes a photomultiplier means responsive to said emitted light for generating said electrical pulses, whereby a relatively large power gain from said alternating current to said electrical pulses is achieved.

11. In combination:

a frequency modulated oscillator that generates an alternating current of variable frequency;

a device that responds to a physical condition of variable magnitude or varying the frequency of said alternating current by an amount that is a function of the magnitude;

a fluorescent target having a relatively short delay time;

means for directing an electron beam towards said target to cause said target to emit light from the point thereon at which said beam impinges;

a mask having a plurality of equally spaced sectors that are disposed along a selected path positioned to receive said emitted light;

means controlled by said alternating current for causing said beam and hence said emitted light to cyclically scan said mask along said selected path at a primary frequency proportional to said variable magnitude;

pulse developing means controlled by the successive impingement of said light on the sectors of said mask for developing a series of electrical pulses for each scanning cycle;

and means for measuring the number of such electrical pulses that are developed during a predetermined time interval, whereby to multiply said primary frequency by one-half the number of said spaced sectors;

said mask being interchangeable with a different mask having a different number of sectors thereby to change said multiplying factor.

12. In combination: a device that responds to a physical condition of variable magnitude to produce an alternating electrical signal that has a primary frequency that varies as a function of the magnitude;

a phase-splitter for converting the output of said device into a pair of signals that are spaced apart by a fixed electrical angle at said primary frequency, irrespective of the magnitude of said physical condition; a flourescent target;

means controlled by said pair of signals for causing an electron beam to scan said target along a peripheral path at an angular velocity that is proportional to said primary frequency, thereby to cause said target to emit light from the point thereon at which said beam impinges;

a mask disposed on the path of light emitted by said target having a plurality of peripheral light transmitting sectors that are spaced apart at uniform angular intervals; means disposed on the path of said light passing through said sectors controlled by successive impingement of said light on the sectors of said mask for developing a series of electrical pulses at a secondary frequency that is an integral multiple of said primary frequency; and means for measuring the number of said electrical pulses that are developed during a predetermined time interval.

References Cited in the file of this patent

UNITED STATES PATENTS

| 2,086,904 | Evans | July 13, 1937 |
| 2,405,519 | Rajchman | Aug. 6, 1946 |
| 2,859,619 | Fellows | Nov. 11, 1958 |
| 2,949,773 | Batchelder | Aug. 23, 1960 |